United States Patent [19]

Rogers

[11] Patent Number: 5,228,574
[45] Date of Patent: Jul. 20, 1993

[54] REUSABLE TRASH BAG OR FOOD BAG CONTAINER AND METHOD OF MAKING IT

[75] Inventor: Thomas A. Rogers, Fairport, N.Y.

[73] Assignee: Mobil Oil Corporation, Fairfax, Va.

[21] Appl. No.: 783,018

[22] Filed: Oct. 25, 1991

[51] Int. Cl.$^5$ .................................. B65D 30/20
[52] U.S. Cl. ................................ 206/494; 53/452; 383/2; 383/38; 383/120; 493/244
[58] Field of Search ................ 383/2, 38, 120; 493/244, 245; 53/452; 206/494

[56] References Cited

U.S. PATENT DOCUMENTS

| | | |
|---|---|---|
| 790,194 | 5/1905 | Douglass et al. |
| 932,721 | 8/1909 | Reuter. |
| 1,553,697 | 9/1925 | Lederer .................... 383/2 |
| 1,604,658 | 10/1926 | Post ........................... 383/2 |
| 1,606,107 | 11/1926 | Simms ....................... 383/2 |
| 1,730,603 | 10/1929 | Carlson ..................... 383/2 |
| 2,346,571 | 4/1944 | Ginsberg ................. 383/38 |
| 2,450,040 | 9/1948 | Gibson ..................... 383/2 |
| 2,811,280 | 10/1957 | Commisso et al. ..... 206/494 |
| 2,861,735 | 11/1958 | Faltin ....................... 383/2 |
| 2,927,617 | 3/1960 | Kurzrock ................. 383/2 |
| 3,425,470 | 2/1969 | Wuest . |
| 3,827,552 | 8/1974 | Janhonen ................. 383/8 |
| 4,640,411 | 2/1987 | Fery ......................... 383/2 |

Primary Examiner—Stephen P. Garbe
Attorney, Agent, or Firm—Alexander J. McKillon; Charles J. Speciale

[57] ABSTRACT

The invention is directed to a thermoplastic film package having one or more pouches for holding articles such as thermoplastic film bags, and a method of producing and filling such a package. The package is made from a thermoplastic film bag folded along horizontal and vertical fold lines such that a pouch having an open end is defined by the walls of the bag. It is non-permanently and non-destructively secured by adhesive tape or a selectively applied adhesive in the folded position such that the pouch can be used for storing articles. The entire thermoplastic film bag enclosure is accessible upon release of the non-destructive adhesive or tape and unfolding of the bag along the horizontal and vertical fold lines.

19 Claims, 5 Drawing Sheets

FIG. 2
FIG. 3
FIG. 4
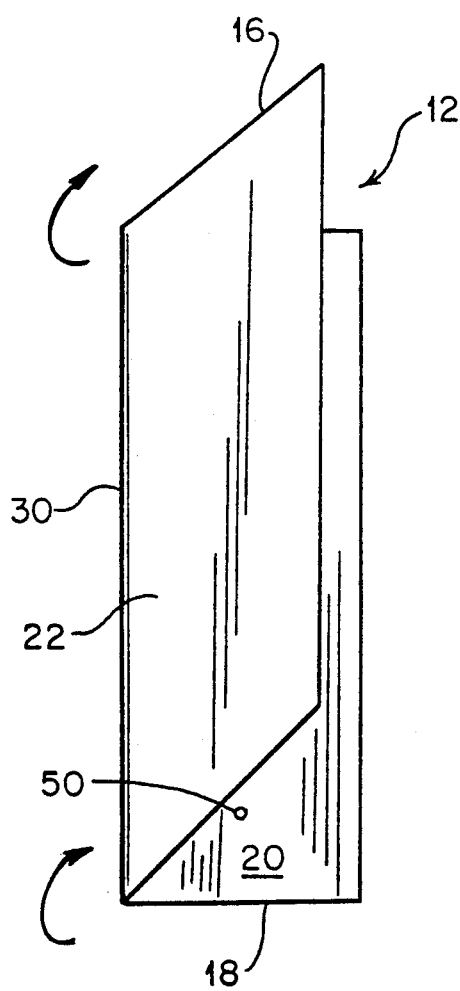
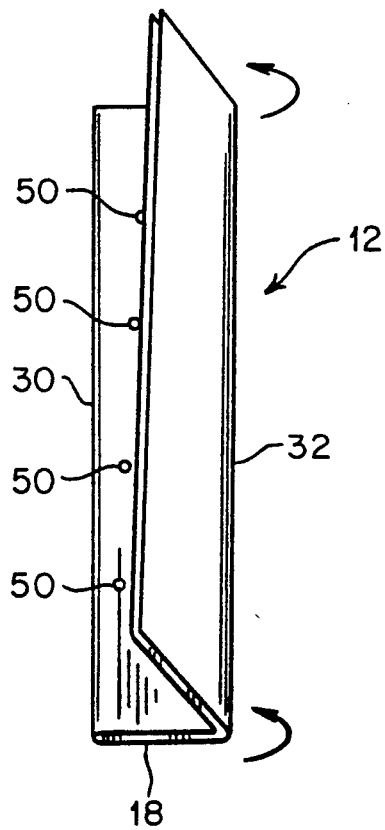
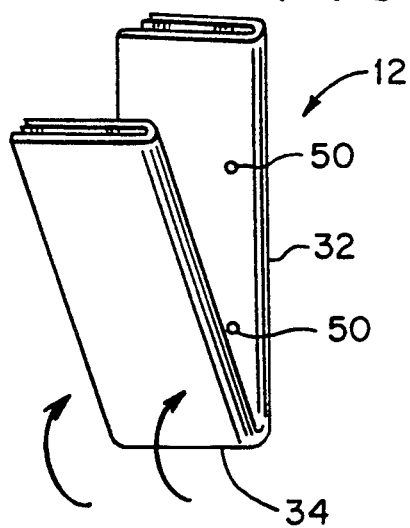

FIG. 5
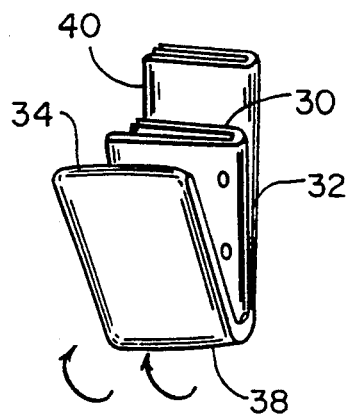
FIG. 6a
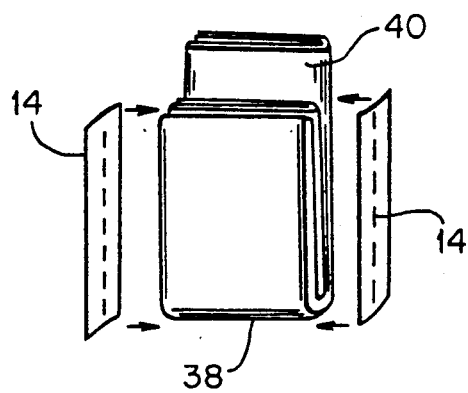
FIG. 6b
FIG. 6c
FIG. 7
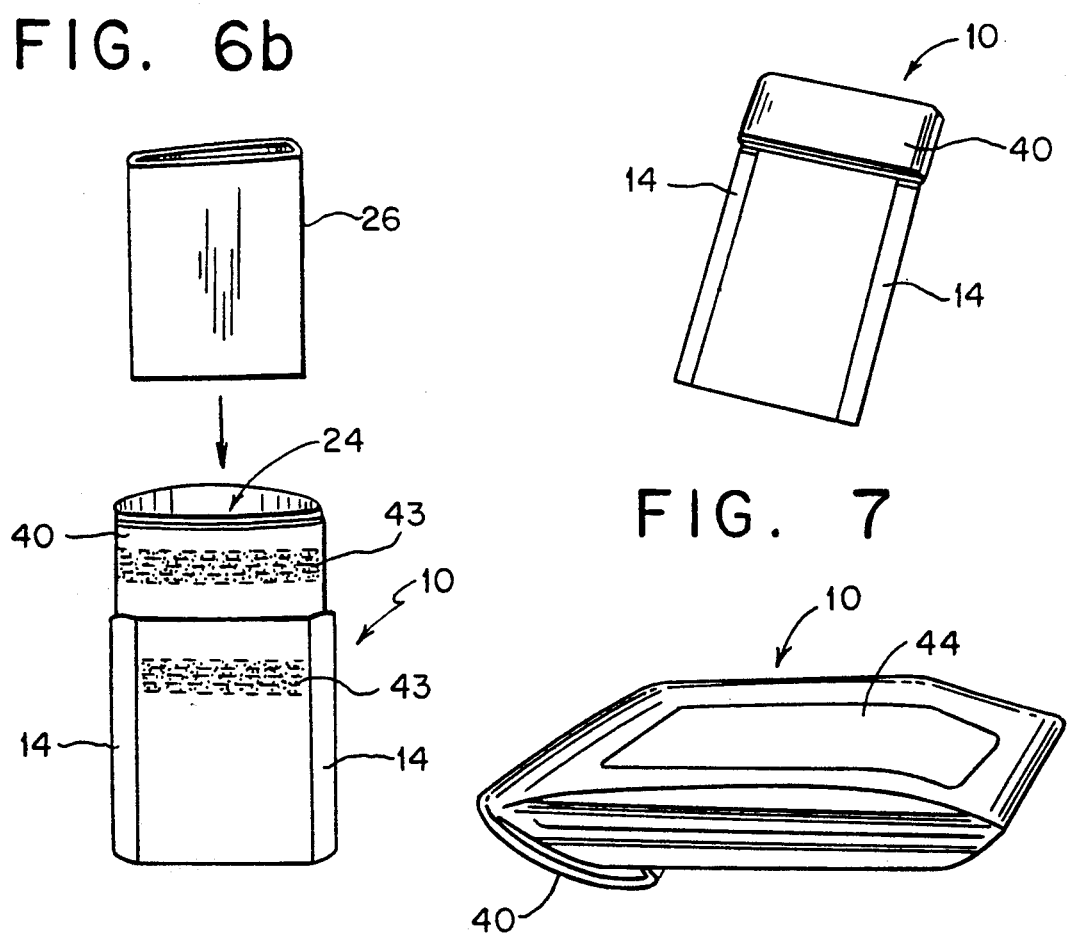

REUSABLE TRASH BAG OR FOOD BAG CONTAINER AND METHOD OF MAKING IT

BACKGROUND OF THE INVENTION

1. Field of the Invention

The present invention relates to thermoplastic film bags, and more particularly, thermoplastic film bags that are foldable and non-permanently and non-destructively held in a folded position. It further relates to a method of packaging articles in such a manner that waste is virtually eliminated.

2. Brief Description of the Prior Art

Bags that are foldable to vary their size are known in the art. Such bags have been used to hold fruit and personal articles. One such bag is disclosed in U.S. Pat. No. 3,425,470 to Wuest. The Wuest device is a combination hand bag and basket made of a material capable of folding. The body of the hand bag can be collapsed or expanded to form a hand bag of varying sizes, or be collapsed or expanded to provide a receptacle in basket form in varying sizes. The basket in each instance includes a handle and flap.

A combined fruit picking sack and measure is disclosed in U.S. Pat. No. 790,194 to Douglass et al., which relates to an improvement in receptacles for gathering or picking fruit or the like. The apparatus includes a bag having a plurality of hooks, and a stiffening member extending transversely across the lower end of the bag.

A folding bag is disclosed in U.S. Pat. No. 932,721 to Rueter which includes a bag which may be used as an ordinary lady's handbag and may be extended so as to form a shopping bag. The folding bag consists of an ordinary bag frame, having a sack-like receptacle, made of leather or of any other suitable fabric, and a size adapted to receive a large quantity of articles to be carried along.

Thermoplastic film bags are commonly used as trash bags or food bags and are stored ready for use in, for example, a cardboard container. The container is discarded when the last thermoplastic film bag is used. Thus, the container contributes as a source of waste.

It is an object of the present invention to provide a thermoplastic film package that substantially reduces waste product.

It is another object of the present invention to provide a thermoplastic film package that is formed from a single thermoplastic film bag.

It is a still further object of the present invention to provide a thermoplastic film package having at least one pouch for holding at least one thermoplastic film bag.

Yet another object of the present invention is to provide a thermoplastic film package that is non-permanently and non-destructively held together such that the thermoplastic film package is not damaged when unfolded.

A still further object of the present invention is to provide a thermoplastic film package that is usable as a thermoplastic film bag.

SUMMARY OF THE INVENTION

In accordance with these and other objects of the invention, the present invention provides a thermoplastic film package which includes a bag folded along at least one horizontal fold line and at least one vertical fold line such that a pouch having an open end is defined by the walls of the bag. The thermoplastic film package further includes means for releasably, i.e. non-permanently and non-destructively, holding the bag as folded along the fold lines such that the pouch can be used for storing articles. The entire bag enclosure is accessible upon release of the holding means and unfolding of the bag along the horizontal and vertical fold lines.

A method of producing and filling such a thermoplastic film package is also provided by the invention. The method includes the steps of folding a thermoplastic film bag along horizontal and vertical fold lines such that a pouch having an open end is defined by the walls of the bag. The bag is releasably secured in the folded position, whereupon the pouch may be filled with articles such as other thermoplastic bags.

BRIEF DESCRIPTION OF THE DRAWINGS

FIGS. 2-5 are perspective views showing the sequential steps of folding a thermoplastic bag into a preferred configuration in accordance with the invention.

FIGS. 6a-6c schematically illustrate the steps of securing, filling and closing the bag folded in the manner shown in FIGS. 1-5.

FIG. 7 is a top perspective view of the thermoplastic film package shown in FIG. 6C.

DETAILED DESCRIPTION OF THE INVENTION

A thermoplastic film package 10 is provided for holding articles. The package has a generally flat, space-saving configuration, and is designed to contain one or more thermoplastic film bags or other articles.

The thermoplastic film package 10 is made from a folded thermoplastic film bag 12 which is non-permanently and non-destructively sealed in the folded position. The resulting package can simply be unfolded to provide a usable thermoplastic film bag. The thermoplastic film package 10 accordingly is not discarded in the manner of most packaging materials, but is instead usable as a thermoplastic film bag.

Figure 1:
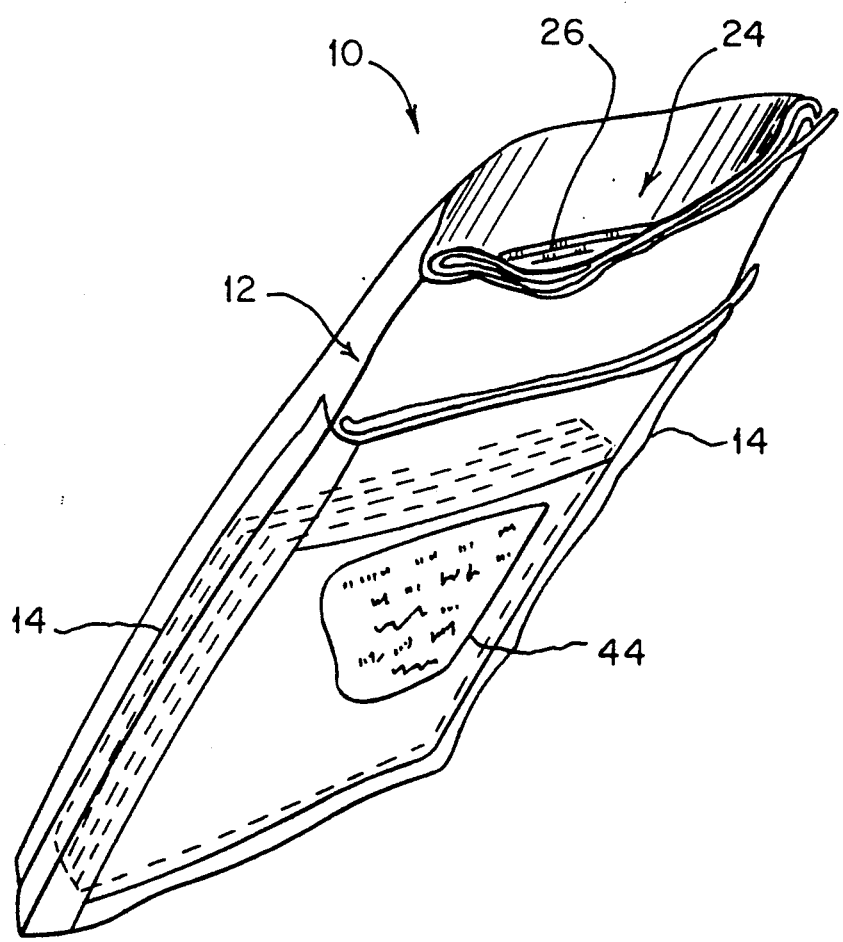
FIG. 1 is a top perspective view of a thermoplastic film package having a filled pouch according to the invention.

Referring to FIG. 1, the thermoplastic film package 10 includes a thermoplastic film bag 12 which is folded along a plurality of vertical and horizontal fold lines. One or more adhesive strips 14 are employed for non-permanently and non-destructively holding the bag 12 in a folded position to create a package. A tacky adhesive between the folded bag layers may alternatively be employed for this purpose. Heat sealing is yet another possible alternative.

The thermoplastic film bag 12, as shown in FIG. 2, includes an open top end 16, a sealed bottom end 18, and a pair of side walls 20, 22. The side walls are connected to each other by the sealed bottom end and along their longitudinal edges. The bag may be made from two sheets which are sealed along their respective side and bottom edges to each other, or from a tubular body sealed along an edge portion thereof.

The thermoplastic film package includes at least one pouch 24 that is accessible from the top end thereof. In one preferred embodiment of the invention, the pouch 24 of the thermoplastic film package 10 is filled with other thermoplastic film bags 26. The pouch of the thermoplastic film package 10 may hold, for example, food bags, or trash bags.

Figure 8:
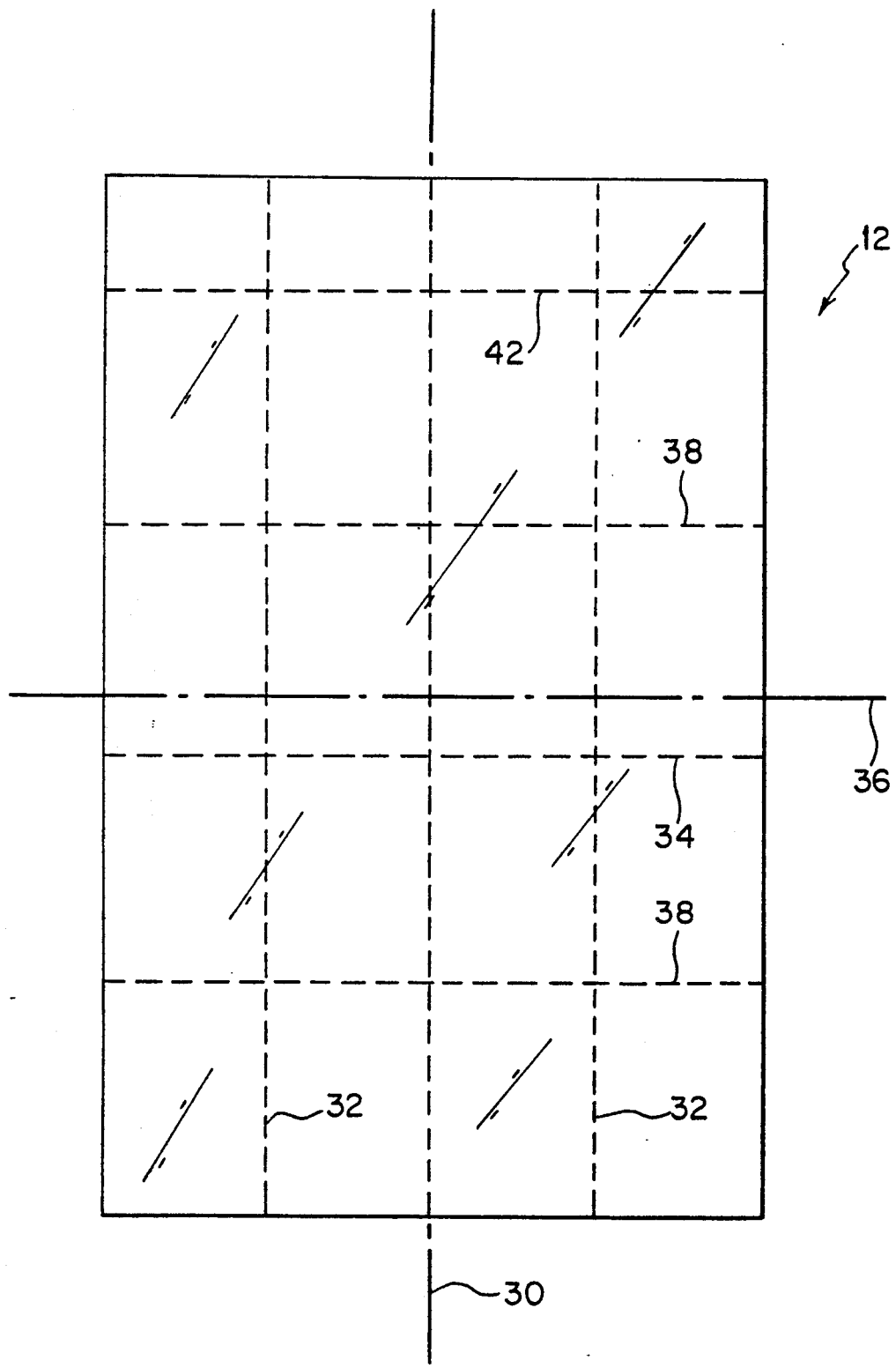
FIG. 8 is a top plan view of the thermoplastic film bag showing the fold lines to be made in accordance with the invention.
Figure 9:
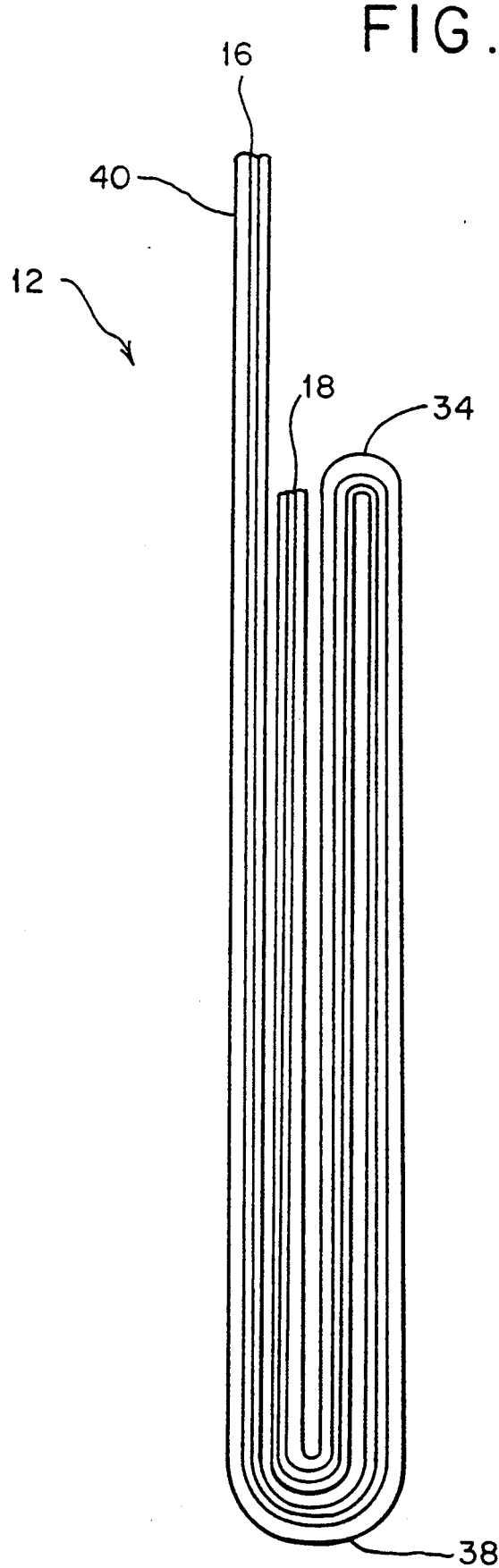
FIG. 9 is an enlarged, side elevation view of a thermoplastic film bag folded according to the invention.

Referring to FIGS. 2-5 and 8, the thermoplastic film bag 12 is folded along a number of vertical and horizontal lines which are shown in grid form in FIG. 8 for purposes of illustration. The thermoplastic film bag includes a vertical center line 30, along which the bag is preferably initially folded, as shown in FIG. 2. A second vertical fold line 32, which extends through four layers of material and is therefore shown as two grid lines in FIG. 8, is positioned between the vertical center line 30 and the respective side edges of the bag 12. The second fold is made along this line, as shown in FIG. 3. A first horizontal fold line 34 extends between and parallel to the horizontal center line 36 and the sealed bottom end 18 of the thermoplastic film bag 12, as shown in FIG. 8. The bag is folded along this line in the manner shown in FIG. 4. A second horizontal fold is made in the bag as already folded twice along the respective vertical fold lines and once along the first horizontal fold line, as shown in FIG. 5. The line 3 along which this fold is made is accordingly shown in two places in FIG. 8. The resulting bag includes a closure flap 40 which may be releasably secured to the main body of the resulting package.

The folded thermoplastic film bag 12 as shown in FIG. 6a is releasably sealed by the adhesive strips 14 to leave the at least one relatively long pouch 24. The pouch 24 is then filled with a plurality of thermoplastic film bags 26 as shown in FIG. 6b. Lastly, the bag 12 is folded about a horizontal line 42 to seal the contents of the pouch. The portion of the package above the last mentioned fold line constitutes the closure flap 40. Pressure-sensitive adhesive 43 may be applied to the closure flap and/or the main body of the package in order to provide the desired releasable sealing characteristics.

Labels 44 may be applied to the front and/or rear surfaces of the package 10 to indicate a brand name, the contents of the package, or other pertinent information.

The adhesive strips 14 used for securing the sides of the package 10 may be perforated or otherwise weakened. This allows the user to more easily open the bag 12 from which the package is made once the contents of the pouch have been used up. Upon pulling the package apart in a manner opposite to the procedure shown in FIG. 5, the strips will split along the respective lines of perforation. The bag can then be used as a trash bag or for other purposes rather than being discarded.

An adhesive may alternatively or additionally be applied to the walls of the bag prior to or during the folding operation to releasably secure various portions of the walls to each other. The adhesive may be applied in the form of dots 50, lines (not shown), or other patterns. The adhesive bonds should be strong enough to hold the bag in the folded position, but not so strong that the bag is damaged when unfolded.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A thermoplastic film package comprising:

a thermoplastic film bag having flexible walls defining an enclosure having an open top end and a closed bottom end, said bag being folded along at least on horizontal fold line and at least one vertical fold line such that at least one pouch having an opening is defined by the walls of the bag as folded along said fold lines; and means including a perforated adhesive strip applied to selected portions of the walls of said bag for releasably holding said bag as folded along said fold lines such that said pouch can be used for storing articles, the entire bag enclosure being accessible from the open top end of said enclosure upon release of said holding means and unfolding of said bag along said horizontal and vertical fold lines.

2. A thermoplastic film package as defined in claim 1 wherein said pouch contains at least one thermoplastic film bag.

3. A thermoplastic film package as define in claim 1 wherein said bag is folded along at least tow horizontal fold lines and at least two vertical fold lines.

4. A thermoplastic film package as defined in claim 1 wherein said bag is folded such that said package includes a main body portion including said pouch and a closure flap extending from the main body portion and foldable over the opening of said pouch.

5. A thermoplastic film package as described in claim 4 including means for releasably securing said closure flap to the main body portion of said package.

6. A thermoplastic film package as described in claim 1 wherein said holding means further include an adhesive applied between adjoining portions of he walls of said bag.

7. A thermoplastic film package as described in claim 1 wherein said holding means include a second perforated strip adhered to the walls of said bag, said adhesive strips defining a pair of longitudinal edges of said package.

8. A method for producing a thermoplastic film package containing a plurality of articles, comprising:

providing a thermoplastic film bag having walls defining an enclosure having an open top end and a closed bottom end;

folding said thermoplastic film bag along at least one horizontal fold line and at least one vertical fold line such that a pouch having an opening is defined by the walls of said bag as folded along said fold lines;

releasably securing said bag as folded along said fold lines by applying a plurality of adhesive strips to selected wall portions of said bag such that said pouch can be used for storing articles; and inserting a plurality of articles into said pouch through said opening.

9. A method as described in claim 8 wherein said strips are applied to the selected wall portions of said bag such that said strips form a pair of longitudinal edge portions of said package.

10. A method as described in claim 8 including the step of inserting a plurality of thermoplastic film bags within said pouch.

11. A method as described in claim 8 including the steps of folding said bag along at least two horizontal fold lines and at least two vertical fold lines.

12. A method as described in claim 8 including the steps of folding said bag such that said package includes a generally flat, main body portion including said pouch and a closure flap extending from the main body portion and foldable over the opening of said pouch.

13. A method as described in claim 12 including folding the closure flap over the opening of the pouch.

14. A method as described in claim 13 including the step of releasably securing the closure flap to the main body portion of said package.

15. A method as described in claim 8 including the step of applying adhesive to selected portions of the walls of said bag such that the bag is releasably maintained in position upon folding the bag.

16. A method as described in claim 8 including the step of securing said adhesive strips to said bag subsequent to folding said bag along said horizontal and vertical fold lines, said adhesive strips being perforated.

17. A thermoplastic film package comprising:
a thermoplastic film bag having flexible walls defining an enclosure having an open top end and a closed bottom end, said bag being folded along at leas tone horizontal fold line and at least one vertical fold line such that at least one pouch having an opening is defied by the walls of the bag as folded along said fold lines; and
means for releasably holding said bag as folded along said fold lines such that sad pouch can be used for storing articles, said means for releasably holding including an adhesive applied between adjoining portions of the walls of said bag, the entire bag enclosure being accessible from the open top end of said enclosure upon release of said holding means and unfolding of said bag along said horizontal and vertical fold liens.

18. A method for producing a thermoplastic film package containing a plurality of articles, comprising:
providing a thermoplastic film bag having walls defining an enclosure having an open top end and a closed bottom end;
folding said thermoplastic film bag along at least one horizontal fold line and at least one vertical fold line such that a pouch having an opening is defined by the walls of said bag as folded along said fold lines;
releasably securing said bag as folded along said fold liens by applying adhesive to selected portions of the walls of said bag such that said bag is releasably maintained in position upon folding said bag and said pouch can be used for storing articles; and
inserting a plurality of articles into said pouch through said opening.

19. A method as described in claim 18 including the step of inserting a plurality of thermoplastic film bags within said pouch.

* * * * *